June 6, 1950 W. H. CLEARY 2,510,211
DUAL-PURPOSE CONTAINER
Filed Aug. 6, 1947 2 Sheets-Sheet 1

INVENTOR.
WILLIAM H. CLEARY
BY Paul, Paul & Moore
ATTORNEYS

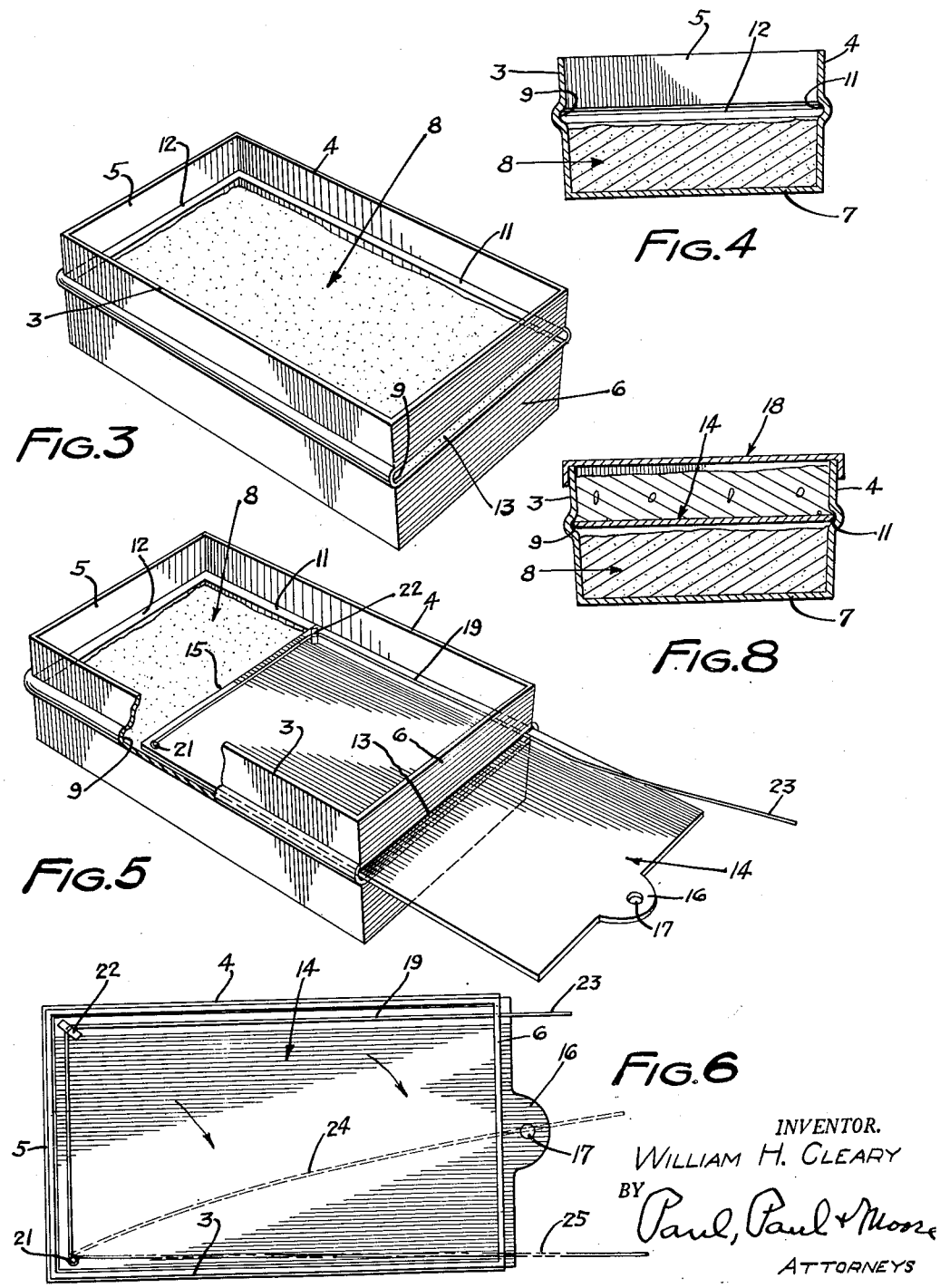

UNITED STATES PATENT OFFICE 2,510,211

DUAL-PURPOSE CONTAINER

William H. Cleary, Minneapolis, Minn., assignor of one-half to John D. Shourt, Minneapolis, Minn.

Application August 6, 1947, Serial No. 766,529

3 Claims. (Cl. 229—15)

This invention relates to new and useful improvements in containers, and more particularly to a dual purpose container having means provided therein for removably receiving a partition whereby the interior of the container may be divided into two compartments each adapted to receive a different food article or confection.

In recent years, it has become very popular to package various forms of food articles in small containers or packages and then freezing the product therein and storing the container with its frozen product in a freezing chamber until delivered to the consumer. This has made it possible to package such food products as ice cream and the like for future consumption.

Ice cream and cake are often closely associated with one another as a confection or luncheon food, and in view of the fact that baked cake may readily be frozen without impairing its original qualities, I propose to provide a novel dual-purpose container, preferably constructed of a suitable wood fiber material chemically treated to withstand baking temperatures, whereby a portion of cake or pastry may be baked directly in the lower portion of the container, after which a partition is inserted into the container over the cake or other food article supported in the bottom of the container and a second food article such as ice cream may then be placed on the partition over the cake and frozen in position therein, after which a suitable cover is fitted over the open top of the container, and the filled container may then be placed in a freezing chamber for storage until it is subsequently sold to a consumer.

An important object of the invention therefore, is to provide a suitable dual purpose container of a convenient size which may readily be stored in conventional domestic freezers, and each container comprising a compartment for a food article such as a portion of cake, and a second compartment being adapted to contain a frozen food article, such as ice cream, sherbet, and the like, the ice cream being separated from the cake by a moistureproof partition, whereby the separated portions of cake and ice cream contained in each container may be retained therein for a long period, without affecting the condition of each other, provided the contents of the container are retained in a frozen state.

A more specific object of the invention is to provide a dual purpose container comprising a permanently closed bottom and having a plurality of upright walls, all but one of which have formed thereon integral inwardly facing guide channels disposed between the top and bottom of the container and in a common plane, and an elongated opening or slot being formed in the remaining wall through which a flat partition may readily be inserted to divide the interior of the container into two separate compartments, the edges of the partition being received in said guide channels whereby the two food articles may be placed in the container and completely separated from one another.

A further object is to provide a container of the class described having means formed on the interior surface of three of its walls for receiving the marginal edges of a removable partition, the fourth wall of the container having an elongated horizontal slot therein through which the partition may be inserted into the container after the lower portion of the container has been filled with a suitable commodity such as cake.

A further object is to provide a container particularly adapted for dispensing portions of cake and ice cream in a single package, the container being formed of a suitable material in which the cake may be baked, and means being provided on the inner faces of at least two of the walls of the container between the top and bottoms thereof cooperating to provide guideways for receiving a partition insertable through an elongated opening in another of the container walls, whereby when the cake has been baked and the partition is inserted into the container over the cake, ice cream or some other confection or food article may be placed in the upper compartment of the container and frozen therein so that the cake and ice cream may be stored in a single package in a suitable freezing chamber until sold to the consumer or trade.

Other objects of the invention reside in the unique construction of the container and the means provided therein for receiving and supporting a removable partition; in the novel manner of slotting a wall of the container, whereby a partition member may readily be inserted into the container to divide its interior into upper and lower compartments; in the means provided on the partition to facilitate freeing it from the frozen product or ice cream supported thereon, when it is desired to withdraw the partition from the container to allow the ice cream to directly contact the cake, prior to consumption; and in the provision of such a container which readily lends itself for manufacture in quantity production, whereby it may be sold to distributors at a moderate price.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 3 is a view showing the lower portion of the container filled;

Figure 4 is a cross sectional view of Figure 3;

Figure 5 is a perspective view of the container with its lower portion filled with a suitable commodity such as cake, and the removable partition being shown partially withdrawn from the container;

Figure 6 is a top view of Figure 7, showing the means provided on the partition for facilitating freeing the partition from the ice cream or other frozen commodity supported directly thereon;

Figure 8 is a cross sectional view substantially on the line 8—8 of Figure 1.

Figure 7:
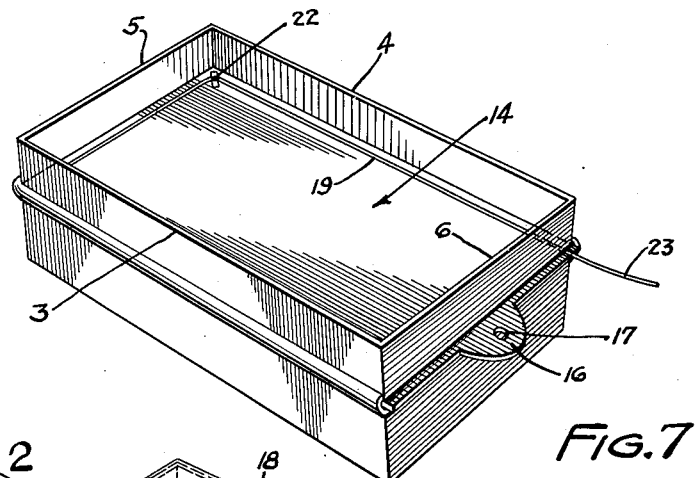
Figure 7 is a perspective view showing the lower portion or compartment of the container filled, and the partition inserted into the container to conceal the cake or product contained in the lower compartment.

The novel container herein disclosed is shown comprising a body, generally designated by the numeral 2, comprising side walls 3 and 4, end walls 5 and 6, and a bottom wall 7. The container is normally open, as shown in Figure 3, and is adapted to receive a suitable cake dough shown at 8 in Figure 3, whereby the cake may be baked directly in the container whereby it need not be removed therefrom until it is to be consumed by the ultimate purchaser. The container is preferably made from a suitable wood fiber material which is chemically treated to withstand baking temperatures, and whereby the container walls are also rendered moistureproof.

An important feature of the present invention resides in the provision of means in the container whereby the interior thereof may be quickly divided into two compartments which are completely separated from one another so that different products may be contained in said compartments without danger of intermixing. To thus conveniently divide the interior of the container into two compartments, the opposed side walls 3 and 4 and the end wall 5 are shown provided with integral inwardly facing channels 9, 11, and 12, respectively, which are disposed between the bottom wall 7 of the container and the top edges of its walls, and in a common plane, as will readily be noted by reference to the drawings. The end wall 6 has an elongated opening or slot 13 therein which extends substantially the length of the wall, and is disposed in the plane of the channels 9, 11, and 12.

Figure 2:
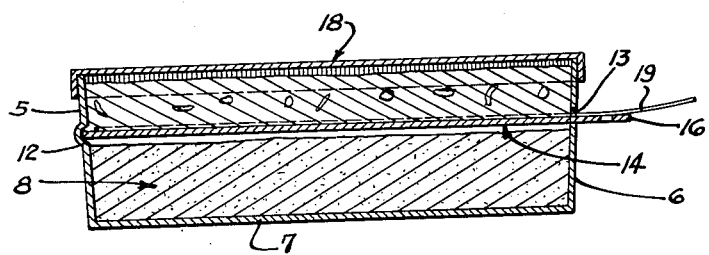
Figure 2 is a longitudinal sectional view substantially on the line 2—2 of Figure 1.

A suitable partition 14, which may be constructed of a material similar to that from which the container walls are made, is fashioned to be inserted through the slot 13 with its side edges received in the inwardly facing channels 9 and 11, whereby these channels form guides for guiding the partition 14 into and out of the container. When the partition 14 is fully inserted into the container, as shown in Figures 2, 6 and 7, the end edge 15 thereof will be received in the channel 12 of the end wall 5, whereby it will be noted the partition 14 is supported around its entire circumference by the channels 9, 11 and 12, and the bottom wall of the slot 13. A suitable tab 16 is provided at one end of the partition 14 to facilitate inserting it into the container and subsequently removing it therefrom. The tab 16 may also be apertured as shown at 17 to facilitate suspending the partition from a nail or hook.

Figure 1:
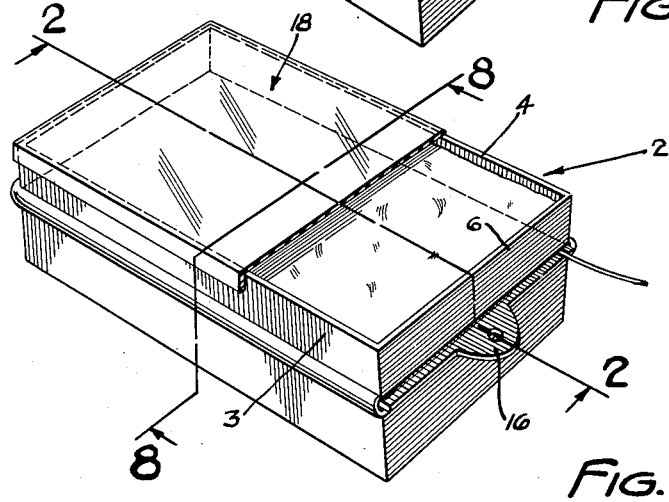
Figure 1 is a perspective view showing my dual purpose container filled with a food product, the cover being partially broken away to more clearly illustrate the construction of the container.

In the operation of the device, the cake is first baked in the lower portion of the container, when the latter is in the form shown in Figure 3. After the cake has been baked and the container has been thoroughly cooled, the partition 14 is inserted into the container as shown in Figures 2, 5 and 6, and the entire unit may then be suitably chilled before filling the upper compartment, of which the tray 14 forms the bottom, with ice cream or some other such commodity which is to be frozen. After filling the upper compartment with the unfrozen or partially frozen cream, a suitable cover 18 may be placed over the open top of the container, as shown in Figures 1, 2 and 8, and the filled container may then be placed in a suitable freezing chamber to freeze the ice cream into a solid mass, after which the filled container may be placed in a suitable freezing chamber such as are now commonly found in most retail stores where confections, groceries, and other commodities are dispensed to the public.

Another important feature of the invention resides in the means provided for facilitating the withdrawal of the partition 14 from the container, when it is desired to empty it of its contents. Ice cream when solidly frozen, has a tendency to adhere to the walls of a container, and it is therefore desirable that means be provided whereby the ice cream may be freed from the partition 14 before withdrawing the latter from the container. To thus release the partition 14 from the ice cream, a small cord 19 has one end fixed to an inner corner of the partition 14, as shown at 21 in Figures 5 and 6. From its anchoring point 21, the cord extends to the opposite corner of the partition 14 where it is lightly secured by such means as a small tape 22. From the tape 22 the tape passes along the adjacent side edge of the partition, as best shown in Figure 6, with its end portion 23 being disposed exteriorly of the container.

With this arrangement, when it is desired to withdraw the partition 14 from the container, the operator first grasps the end portion 23 of the cord 19 and withdraws the cord from the container, whereby the cord is released from the tape 22 and follows generally a course such as indicated by the arrows in Figure 6, as will be understood by the dotted line position 24 of the cord. When the cord reaches the dotted line position shown at 25 in Figure 6, the bottom of the ice cream supported in the upper compartment will be completely released from the partition 14, as will readily be understood, whereby the partition may readily be withdrawn from the container. When the partition is thus withdrawn from the container, the ice cream may settle down on top of the cake and the contents of the container may then be consumed directly from the container, if so desired, or the cake and ice cream may be removed therefrom as a unit.

In the drawings, the supporting means for the partition 14 is shown comprising the channels 9, 11 and 12, which are preferably integrally formed in the compartment walls in the manufacture of the carton. The partition 14 is preferably moistureproof so that it is not likely to become saturated with any liquid or moisture contained in the contents of the upper compartment, prior to such contents being frozen into a solid mass.

If desired, other means may be provided for supporting the partition 14 as for example, inwardly extending flanges, not shown, may be secured to the walls of the container for receiving the marginal edges of the partition in a manner similar to the channels now shown in the drawings.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim:

1. A dual compartment container constructed of a flexible wood fiber material chemically treated to withstand baking temperatures, said container comprising a permanently closed bottom and opposed side and end walls, supporting means on the inner surfaces of certain of said walls disposed between the tops and bottoms thereof, one of said walls having a narrow opening therein extending the length of said wall and disposed in the plane of said supporting means, the portion of said container below said supporting means being adapted to receive a cake dough or other food article to be baked therein, a flat partition insertable through said elongated opening and supported on said supporting means to thereby conceal the cake or other food article prepared in the bottom of the container, and the compartment above the partition being adapted to receive a suitable confection such as ice cream, a cover removably supported on the upper portions of the container walls to completely enclose the container, and a flexible element supported on the top surface of said partition and extending the length thereof and having one end projecting through the elongated opening in a wall of the container whereby said flexible element may be withdrawn from the container, such withdrawal of the element from the container causing the element to move over the upper surface of the partition and free said partition from the ice cream supported thereon, after which the partition may readily be withdrawn from the container and thereby cause the ice cream to be supported directly upon the cake supported in the lower portion of the container, whereby said cake and ice cream combine to form a composite food article ready for serving.

2. A container comprising a permanently closed bottom and a plurality of upright walls, horizontally disposed supporting means on the inner surfaces of certain of said walls and disposed between the top and bottom of the container in a common plane, one of said walls having an elongated horizontal opening therein extending the length of said wall and disposed in the plane of said supporting means, a flat plate adapted to be inserted through said elongated opening into the container and supported on said supporting means, thereby to divide the interior of the container into upper and lower compartments, and a flexible element having one end anchored to the top side of said plate and having its opposite end protruding from the container through said elongated opening, whereby said element may be partially withdrawn from the container, such withdrawal of the element from the container causing the element to move over the surface of the plate and thereby free the plate from food articles supported thereon.

3. A container comprising a permanently closed bottom and opposed side and end walls, inwardly facing guide channels formed in the opposed side walls and one end wall and disposed in a common plane, an elongated opening in the other end wall extending the length thereof and disposed in the plane of said channels, a plate-like partition insertable through said elongated opening into the container with its edges received in said guide channels, said partition dividing the interior of the container into two compartments whereby the bottom compartment may be utilized for receiving a food article such as cake and the upper compartment a frozen confection or food article such as ice cream, and a flexible cord having one end secured to said partition adjacent to one of its inner corners and having an intermediate portion termporarily secured to the partition adjacent to its other inner corner, and the opposite end of said cord protruding from the container through said elongated opening, whereby the cord may be partially withdrawn from the container, such partial withdrawal of the cord from the container causing it to move over the top surface of the partition and thereby free the partition from the frozen food article whereby the partition may be withdrawn from the container, when its contents are to be served.

WILLIAM H. CLEARY.

REFERENCES CITED

The following references are of record in the file of this patent:

UNITED STATES PATENTS

| Number | Name | Date |
| --- | --- | --- |
| 604,388 | Hamilton | May 24, 1898 |
| 707,062 | Heineman | Aug. 12, 1902 |
| 1,319,024 | Warfield | Oct. 14, 1919 |
| 2,362,017 | May | Nov. 7, 1944 |